United States Patent [19]

Brancaccio et al.

[11] 3,893,983

[45] July 8, 1975

[54] PROCESS FOR OBTAINING MODIFIED DIENE POLYMERS

[75] Inventors: Aldo Brancaccio, Cremona; Giuseppe Ghetti; Mario Bruzzone, both of San Donato Milanese, all of Italy

[73] Assignee: Snamprogetti S.p.A., San Donato Milanese, Italy

[22] Filed: Jan. 21, 1974

[21] Appl. No.: 435,082

[30] Foreign Application Priority Data

Feb. 2, 1973  Italy .................................. 19946/73

[52] U.S. Cl. ....................... 260/78.4 D; 260/94.7 A
[51] Int. Cl. ............................................. C08f 27/00
[58] Field of Search ...... 260/78.4 D, 94.7 R, 94.7 A

[56] References Cited
UNITED STATES PATENTS 3,471,432  10/1969  Krol et al. ...................... 260/94.7 A
3,567,691   3/1971  Van Breen et al. ............. 260/78.4 D

*Primary Examiner*—Joseph L. Schofer
*Assistant Examiner*—Maria S. Tungol
*Attorney, Agent, or Firm*—Ralph M. Watson, Esq.

[57]  ABSTRACT

Polyisoprene of improved green strength is prepared by reacting maleic acid with polyisoprene of a high cis 1,4 content and containing at least 3% imbibition water by feeding moist polyisoprene and maleic acid to an extruder-desiccator at a temperature in the range of 140° to 200°C and at a rate such that 0.01 to 5 parts by weight of maleic acid are fed per 100 parts of polyisoprene, whereby the reaction of the maleic acid with the polyisoprene and the desiccation thereof occur at the same time.

3 Claims, No Drawings

PROCESS FOR OBTAINING MODIFIED DIENE POLYMERS

The present invention relates to a process for obtaining diene polymers having superior physical properties.

More particularly the present invention relates to a process for obtaining modified polymers by reacting diolefin base polymers containing imbibition water with unsaturated compounds containing functional groups which cannot be hydrolyzed.

The reaction of modifying the diene polymer is carried out by adding a solution of the unsaturated compound to the solid polymer containing imbibition water by means of mixers suitable for mixing very high viscosity substances.

In such a way it is possible to obtain modified polymers by starting from any kind of diene base elastomeric polymer or copolymer, for instance selected from polyisoprene, polybutadiene, butadiene-styrene copolymers, etc.

The unsaturated compounds containing functional groups preferably are unsaturated carboxylic acids.

When the compound, containing functional groups which cannot be hydrolyzed, is usually obtained by reacting a compound containing hydrolyzed functional groups with water, for instance anhydride in the case of acids, it is possible to add the polymer containing imbibition water anhydride corresponding to acid, so that this latter is formed in situ.

For the sake of illustrating the invention and without limiting it, we shall hereinafter refer to a diene polymer consisting of a polyisoprene having a high 1,4 cis content and to an unsaturated functional compound consisting of maleic acid; it will then be easy, for those skilled in the art, to apply the inventive principles and to modify other polymers. It is known that 1,4 cis polyisoprene has a low value of "green strength" i.e., the uncured product has poor mechanical characteristics, which is a remarkable disadvantage when complex manufactured articles are desired. Particularly a low green strength gives rise to a size instability of the manufactured articles before vulcanization, which results in increased waste. Processes are known for increasing a low "green strength" values, consisting of the reaction between polyisoprene and maleic anhydride, which is fed to the polymer after a complete drying thereof.

However such a reaction has the drawback of polymer degradation of mechanical oxidation type, which cannot be avoided when use is made of a dry polymer: therefore the advantage obtainable from the reaction with maleic anhydride is, for the most part, lacking because of the degradation which negatively affects green strength.

We have found it is possible to modify polyisoprene, increasing green strength to the natural rubber value, by reacting maleic acid with moist polyisoprene (for instance coming from the stripping of the polymerization solution) in suitable mixers-desiccators or extruders dessicators; the modifying reaction and the polymer desiccation occur at the same time, allowing the highest advantage as to green strength to be obtained and the mechanical degradation to be reduced.

The reaction between polyisoprene and modifying compound happens at a temperature ranging from 140°C to 200°C, preferably from 150°C to 170°C, when the polymer, coming from the stripping of the polymerization solution, still has a water content of up to 20% of polymer weight: however it is preferred that the reaction be carried out at a water content ranging between 3 and 10% by weight.

Maleic acid is added as a solution so that 0.01 to 5 parts of agent are added per 100 polymer parts.

The operating characteristics will be more clear by examining the following examples, by which we aim to illustrate the invention without limiting the purposes thereof.

EXAMPLE 1

A sample of cis 1,4 polyisoprene, having a cis 1,4 content of 97%, $[\eta]$ in tolune at 30°C equal to 4,5 dl/g, ML (1+4) at 100°C equal to 75 and having no gel, was fed to an extruder desiccator Werner-Pfleiderer 28 K-53L. The extruder internal temperature was kept at about 170°C and the screws revolved at a speed of about 15 rounds per minute; the polymer was fed as strips at the rate of about 10 kg/hour.

At about half way down the extruder we continuously fed, by means of a piston pump, an acetone solution of maleic acid (1.7M) so that 0.15 part of maleic acid was added per 100 parts of polymer.

The following evaluations were carried out on the polymer which had reacted with maleic acid:
a. A sample of polyisoprene reacted with maleic acid was examined for the determination of % gel in toluene, in fixed little housings for 48 hours, and the Mooney viscosity ML(1+4) at 100°C.
b. A sample of 1500 g of modified polyisoprene was employed for manufacturing a mix in a closed Werner-Pfleiderer GKZUK mixer according to the formalaties reported in Table 2. Plates were obtained from the mix by press moulding at 100°C for 10 minutes followed by cooling in the press. After 24 hours from moulding, test pieces were obtained of the ASTM D 412 type, which were stretched in an Instron vertical dynamometer at a stretch rate of 500 mm/min. The evaluation results are reported in Table 3 together with the ones obtained from natural rubber (SMR5).

EXAMPLE 2

The sample of cis 1,4 polyisoprene used in the test described in the preceding example was fed to a Werner-Pfleiderer 28 K-53L extruder-dessicator. The extruder internal temperature was maintained at about 170°C and the screws revolved at a speed of about 15 r.p.m.

The same evaluations as in example 1 were carried out on the extruded polymer; the results thereof are reported in Table 3.

EXAMPLE 3

A sample of cis, 1,4 polyisoprene, having a cis 1,4 content of 97%, $[\eta]$ in toluene at 30°C equal to 4 dl/g, a Mooney viscosity, ML (1+4) at 100°C, equal to 70 (the properties were determined after having drying the polymer at 100°C under vacuum), coming directly from the stripping of the polymerization solution and containing about 35% water, was fed at a flow rate of 30 kg/h as strips to a Werner-Phleiderer extruder of the type referred to in example 1.

The extruder internal temperature was 170°C and the screws revolved at a speed of 100 r.p.m.

The same evaluations as in example 1 were carried out on the extruded polymer.

The results thereof are reported in Table 3.

EXAMPLE 4

A sample of cis 1,4 polyisoprene used in the aforesaid test was fed to a Werner-Pfleiderer extruder at the same formalties and conditions of examples 3. At about half way down the extruder, wherein % $H_2O$ by on the polymer was ~10% we continuously fed an acetone solution of maleic acid (1.7M) so that 0.22 part of maleic acid was added per 100 parts of polyisoprene.

The same evaluation of example 1 were carried out on the polymer treated as aforesaid.

The results thereof are reported in Table 3.

EXAMPLE 5

A sample of cis 1,4 polyisoprene used in the test of example 3 was fed to a Werner-Pfleiderer ZSK-352 extruder at the same conditions and formalities herein described.

At about half way down the extruder, wherein % $H_2O$ was ~ 10%, we continuously fed an acetone solution of maleic acid (1.7M) so that 0.44 part of maleic acid was added per 100 parts of polymer.

The same evaluations as in example 1 were carried out on the polymer treated as abovesaid.

The results thereof are reported in Table 3.

EXAMPLE 6

Use was made of cis 1,4 polyisoprene having a cis 1,4 content of 97%, a [$\eta$] in a toluene at 30°C of 4 dl/g, and a Mooney viscosity ML(1+4) at 100°C equal 70, the properties having been determined after the dessication of the polymer under vacuum at 40°C: the employed samples came directly from the polymerization and contained about 15% $H_2O$. It was fed as strips, at a flow rate of 30 kg/h, to a Werner-Pfleiderer extruder of the type already described in the introductory part. The extruder internal temperature was 170°C and the extruder screws revolved at 100 r.p.m. At about half way down the extruder (28K-53), wherein % $H_2O$ was ~4%, we continuously fed an acetone solution of maleic acid (1.7M) so that 0.22 part of maleic acid was added per 100 parts of polymer.

The same evaluations as in example 1 were carried out on the polymer treated as abovesaid.

The results of such evaluations are reported in Table 3.

EXAMPLE 7

A sample of cis 1,4 polyisoprene used in example 6 was fed to a Werner-Pfleiderer 28K-53L extruder at the abovesaid conditions and formalities. At about half way down the extruder wherein % $H_2O$ on the polymer was 4%, we continuously fed an acetone solution of maleic acid (1.7M) so that 0.44 part of maleic acid was added per 100 parts of polymer.

The same evaluations as in example 1 were carried out on the polymer treated as abovesaid.

The results thereof are reported in Table 3.

TABLE 1

Test conditions in extruder Werner-Pfleiderer 28K-53L (T = 170°C)

| Ex. | % volatile substances on the polymer | % Volatile substances on the polymer at reactive adding | fed maleic acid (phr) | Screw revolution speed (RPM) |
|---|---|---|---|---|
| 1 | — | — | 0.15 | 15 |
| 2 | — | — | — | 15 |
| 3 | 35 | — | — | 100 |
| 4 | — | 10 | 0.22 | 100 |
| 5 | — | — | 0.44 | — |
| 6 | 15 | 4 | 0.22 | — |
| 7 | — | — | 0.44 | — |

TABLE 2

Modalities for manufacturing the mixes

| Recipe P 1 | 100 | Manufacture in closed mixer Werner GKZUK, by using 1.5 kg of polymer | |
|---|---|---|---|
| Black SRF | 35 | Polymer | 0' |
| Antioxidant BLE (25) | 1.5 | Half gas black | |
| Circosol 4240 | 5 | ZnO - B2E | ½ min. |
| Stearic acid | 3 | Stearic Acid | |
| Zinc Oxide | 5 | Half oil black | 2 min. |
| | | Cleaning | 3½ min. |
| | | Waste | 4½ min. |

TABLE 3

Properties of the modified polymers

| Example | Tol (gel%)25°C | ML(1+4) at 100°C of polymer | ML(1+4) at 100°C of mix | M50% (kg/cm²) | M300% (kg/cm²) | M1000% (kg/cm²) | M1700% (kg/cm²) | CR | AR |
|---|---|---|---|---|---|---|---|---|---|
| 1 | 3 | 42 | 31.5 | 1.57 | 0.82 | — | — | 0.77 | 1550 |
| 2 | ass. | 40 | 30 | 1.1 | 0.36 | — | — | 0.2 | 350 |
| 3 | ass. | 66 | 52 | 1.38 | 0.69 | — | — | 0.69 | 300 |
| 4 | ass. | 67 | 57 | 1.96 | 1.42 | 3.2 | 5.28 | — | — |
| 5 | 5 | 68 | 58 | 2.23 | 1.65 | 3.9 | 7.53 | — | — |
| 6 | 4 | 68.5 | 58 | 2.25 | 1.57 | 3.88 | 6.15 | — | — |
| 7 | 6 | 71 | 59 | 2.37 | 1.83 | 4.37 | 8.6 | — | — |
| SMR 5 | 10 | 85 | 55 | 2.6 | 2.2 | — | — | 10.68 | 900 |

What we claim is:

1. Process for obtaining modified polyisoprene having improved green strength consisting in feeding maleic acid and polyisoprene having a high cis 1,4 content and containing at least 3% imbibition water to a mixer-desiccator, at a temperature of from 140° to 200°C, and at a rate such that 0.01 to 5 parts by weight of maleic acid are fed per 100 parts of polyisoprene, whereby the reaction of the maleic acid with the polyisoprene and the desiccation thereof occur at the same time.

2. Process according to claim 1 characterized in that the reaction is carried out at a temperature of from 150° to 170°C.

3. Process according to claim 1 characterized in that the reaction is carried out on polyisoprene having a water content of from 3 to 10% by weight.

* * * * *